US006742367B2

(12) United States Patent
Wu

(10) Patent No.: US 6,742,367 B2
(45) Date of Patent: Jun. 1, 2004

(54) INSIDE LOCKING DEVICE OF FLAT HANDLE LOCK

(75) Inventor: Wen bin Wu, Kaohsiung Hsien (TW)

(73) Assignee: Taiwan Fu Hsing Industrial Co., Ltd, Kaohsiung Hsien (TW)

(*) Notice: Subject to any disclaimer, the term of this patent is extended or adjusted under 35 U.S.C. 154(b) by 0 days.

(21) Appl. No.: 10/222,885

(22) Filed: Aug. 19, 2002

(65) Prior Publication Data

US 2004/0031300 A1 Feb. 19, 2004

(51) Int. Cl.[7] .......... B60R 25/02
(52) U.S. Cl. .......... 70/224; 70/472; 292/336.3
(58) Field of Search .......... 70/472, 224, 223, 70/221, 218; 292/336.3

(56) References Cited

U.S. PATENT DOCUMENTS 4,920,773 A * 5/1990 Surko, Jr. .......... 70/224
5,177,987 A * 1/1993 Shen .......... 70/224
5,301,526 A * 4/1994 Fann et al. .......... 70/224
5,372,025 A * 12/1994 Lin .......... 70/472
5,768,926 A * 6/1998 Shen .......... 70/472
5,788,296 A * 8/1998 Kuo et al. .......... 292/336.3 X
5,794,472 A * 8/1998 Kester et al. .......... 70/472
5,809,815 A * 9/1998 Lee .......... 70/472
5,816,086 A * 10/1998 Russell, IV .......... 70/472 X
5,868,018 A * 2/1999 Kang .......... 70/472
5,887,465 A * 3/1999 Shen .......... 70/224
5,904,232 A * 5/1999 Shen .......... 70/223 X
5,927,777 A * 7/1999 Kuo et al. .......... 70/224 X
5,934,117 A * 8/1999 Shen .......... 70/224
6,041,630 A * 3/2000 Shen .......... 70/472
6,085,561 A * 7/2000 Yao .......... 70/472
6,101,856 A * 8/2000 Pelletier et al. .......... 70/472
6,151,934 A * 11/2000 Chong et al. .......... 70/221
6,279,360 B1 * 8/2001 Shen .......... 70/224
6,357,270 B1 * 3/2002 Vazquez .......... 70/472
6,412,318 B1 * 7/2002 Shen .......... 70/217
6,425,273 B1 * 7/2002 Kim et al. .......... 70/224
6,481,253 B1 * 11/2002 Fan .......... 70/224 X

* cited by examiner

*Primary Examiner*—Suzanne Dino Barrett
(74) *Attorney, Agent, or Firm*—Bacon & Thomas, PLLC

(57) ABSTRACT

A lock. The lock includes an inner handle assembly, a latch bolt, and an outer handle assembly. The outer handle assembly includes an outer handle, an outer spindle, an actuating sleeve rotatably mounted in the outer spindle and having two guide slots each having an inclined section and a horizontal section, a locking plate mounted in the actuating sleeve and including two wings, and an unlatching member operably connected to the latch bolt. Each wing is extended through an associated guide slot into an associated positioning slot in the outer spindle. When the lock is in an unlocked state, the unlatching member is engaged with the locking plate to allow joint rotation. When the lock is in a locked state, the unlatching member is disengaged from the unlatching member such that the unlatching member is not turned when the outer handle is turned.

9 Claims, 6 Drawing Sheets

INSIDE LOCKING DEVICE OF FLAT HANDLE LOCK

BACKGROUND OF THE INVENTION

1. Field of the Invention

The present invention relates to a lock with damage prevention by forcible turning of an outer handle. In particular, the present invention relates to a lock having an outer handle that rotates freely when it is turned under a locked state, thereby preventing intentional damage to the lock by forcible turning of the outer handle.

2. Description of the Related Art

FIG. 6 of the drawings illustrates an outer handle assembly of a conventional lock. The outer handle assembly comprises a mounting member 90 fixed to a doorplate, an outer rose 92, an outer handle 91, an outer spindle 93, and an actuating sleeve 94 mounted in the outer spindle 93. A locking plate 95 is mounted in the actuating sleeve 94 and includes two ends 951 respectively extending through aligned slots 941 in the actuating sleeve 94 and through aligned slots 931 of the outer spindle 93. The outer spindle 93 is turned when the outer handle 91 is turned. When in a locked state, the ends 951 of the locking plate 95 are respectively retained in two locking grooves 921 in the outer rose 92. The actuating sleeve 94 is actuatable by a tailpiece 912 of a lock core 911 mounted in the outer handle 91 to thereby move the locking plate 95 along a longitudinal direction and thus disengage the locking plate 95 from the locking grooves 921, allowing subsequent unlatching. However, even if in the locked state, an unauthorized person may apply a relatively large force to turn the outer spindle 91, causing disengagement of the ends 951 of the locking plate 95 from the locking grooves 921. The lock is thus damaged.

SUMMARY OF THE INVENTION

It is a primary object of the present invention to provide a lock having an outer handle that rotates freely when it is turned under a locked state, thereby preventing intentional damage to the lock by forcible turning of the outer handle.

A lock in accordance with the present invention comprises an inner handle assembly, a latch assembly having a latch bolt, and an outer handle assembly. The outer handle assembly comprises:

an outer handle;

an outer rose including an axial hole for pivotally receiving an end of the outer handle, the outer rose further including at least one post for connection with the inner handle assembly;

a lock core set mounted in the outer handle and including a lock core that is actuatable by a key to turn, the lock core having a tailpiece;

an outer spindle including a first end connected to the outer handle to turn therewith and a second end including two positioning slots;

an actuating sleeve rotatably mounted in the outer spindle, the actuating sleeve including a hole on an end thereof, the tailpiece extending through the hole of the actuating sleeve, the hole being so configured that the actuating sleeve is turned when the lock core and the tailpiece are turned, the actuating sleeve and the outer spindle being so configured that longitudinal movement of the actuating sleeve relative to the outer spindle is not allowed, the actuating sleeve further including two guide slots each having an inclined section and a horizontal section;

a locking plate mounted in the actuating sleeve and including two wings, each of the wings being extended through an associated one of the guide slots into an associated one of the positioning slots of the outer spindle, each of the wings being retainable by the horizontal section of an associated one of the guide slots;

an unlatching member including a first end releasably engaged with the locking plate to allow joint rotation of the unlatching member and the locking plate, the unlatching member further including a second end operably connected to an inner handle of the inner handle assembly, the unlatching member being operably connected to the latch bolt such that rotation of the unlatching member causes retraction of the latch bolt; and a cap fixed to the second end of the outer spindle and including a hole through which the unlatching plate extends, the hole of the cap allowing free rotation of the unlatching member;

wherein when the lock is in an unlocked state, the first end of the unlatching member is engaged with the locking plate to allow joint rotation; and wherein when the lock is switched from the unlocked state to a locked state, each wing of the locking plate is guided by the inclined section of an associated one of the guide slots and then retained in the horizontal section of an associated one of the guide slots, the unlatching member being moved away from and thus disengaged from the first end of the unlatching member such that the unlatching member is not turned when the outer handle is turned while the lock is in the locked state.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENT

A preferred embodiment in accordance with the present invention will now be described with reference to the accompanying drawings.

Figure 1:
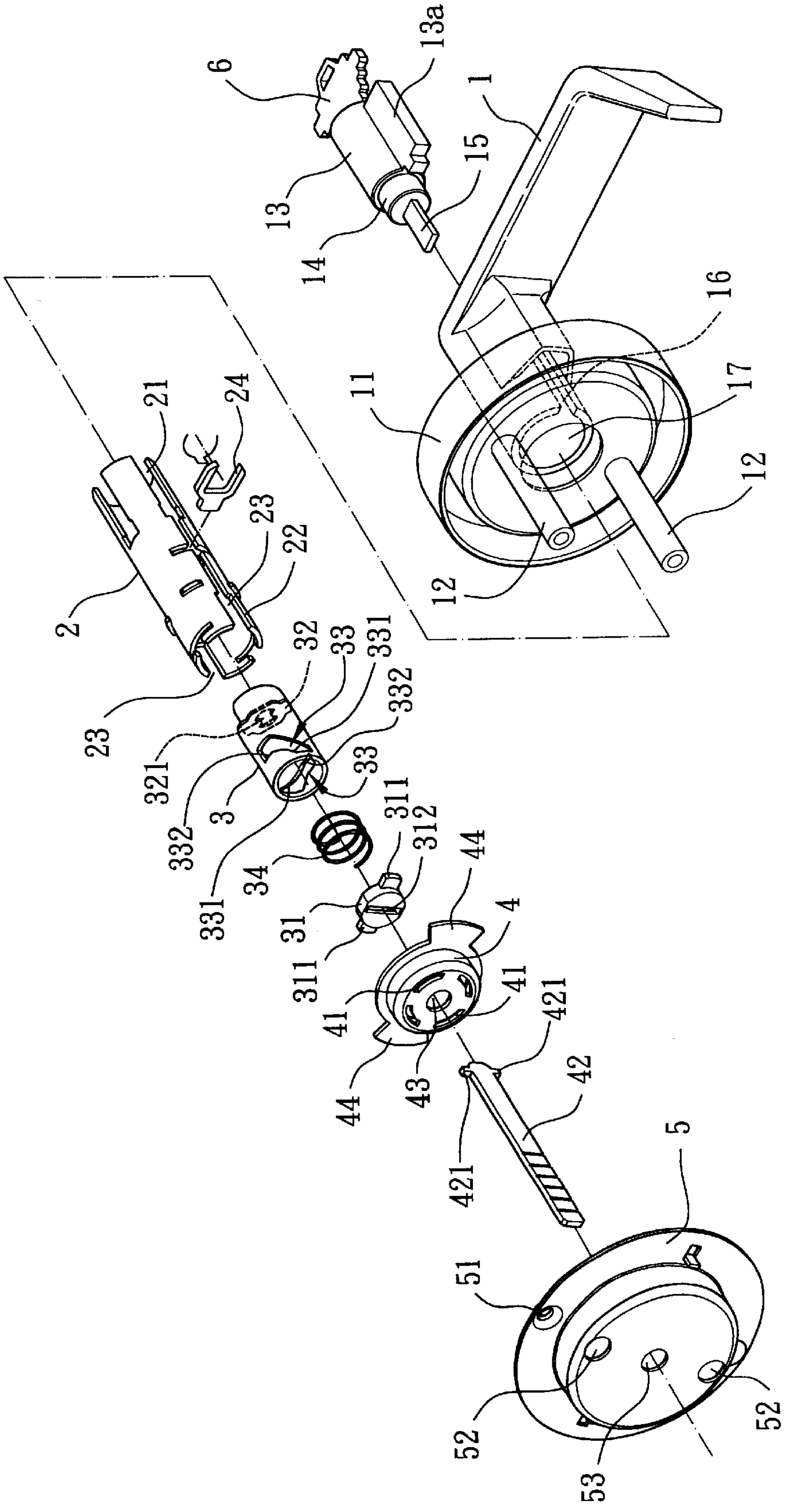
FIG. 1 is an exploded perspective view of an outer handle assembly of a lock in accordance with the present invention.
Figure 5:
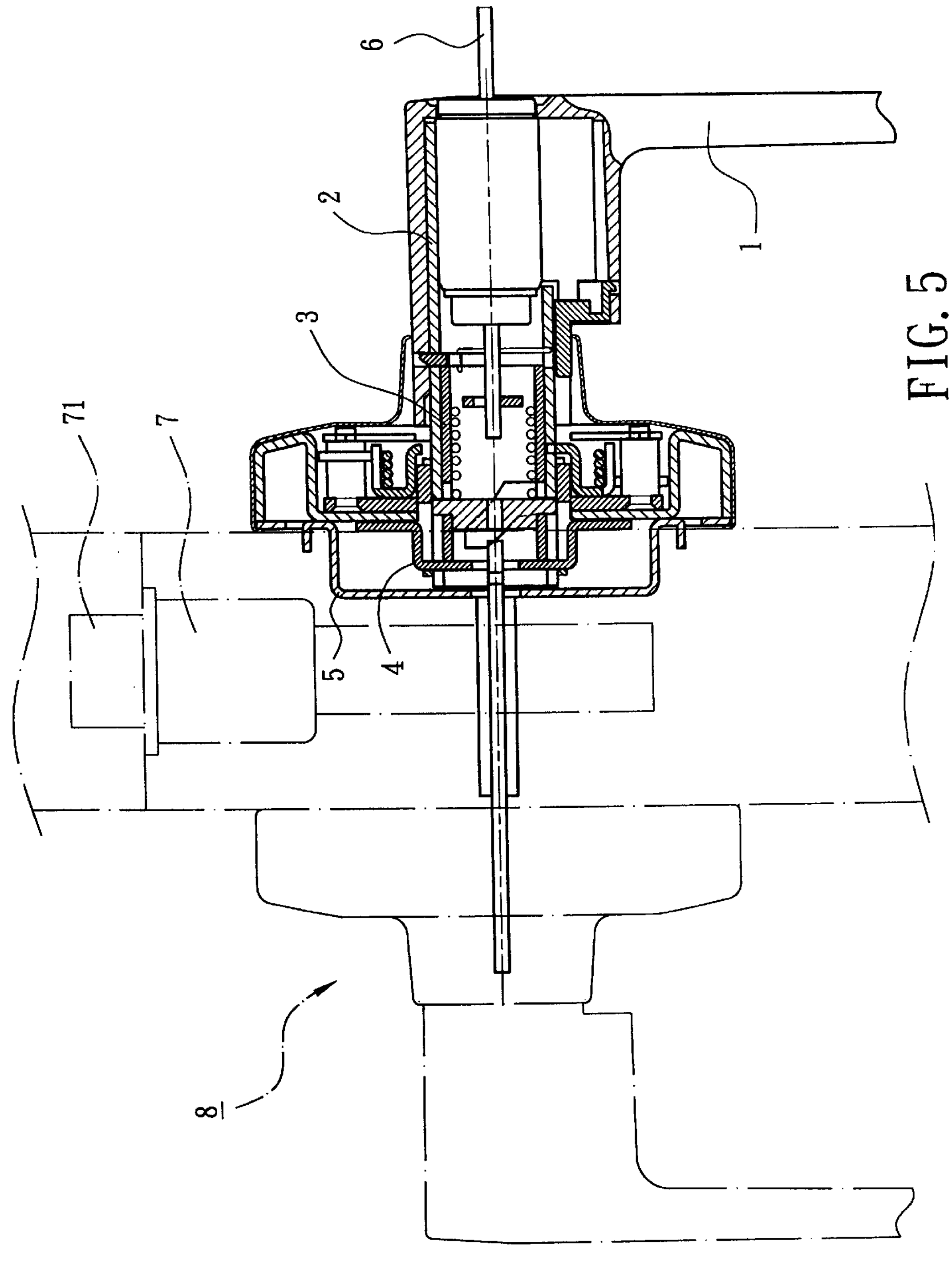
FIG. 5 is a sectional view illustrating mounting of the lock to a doorplate.
Figure 6:
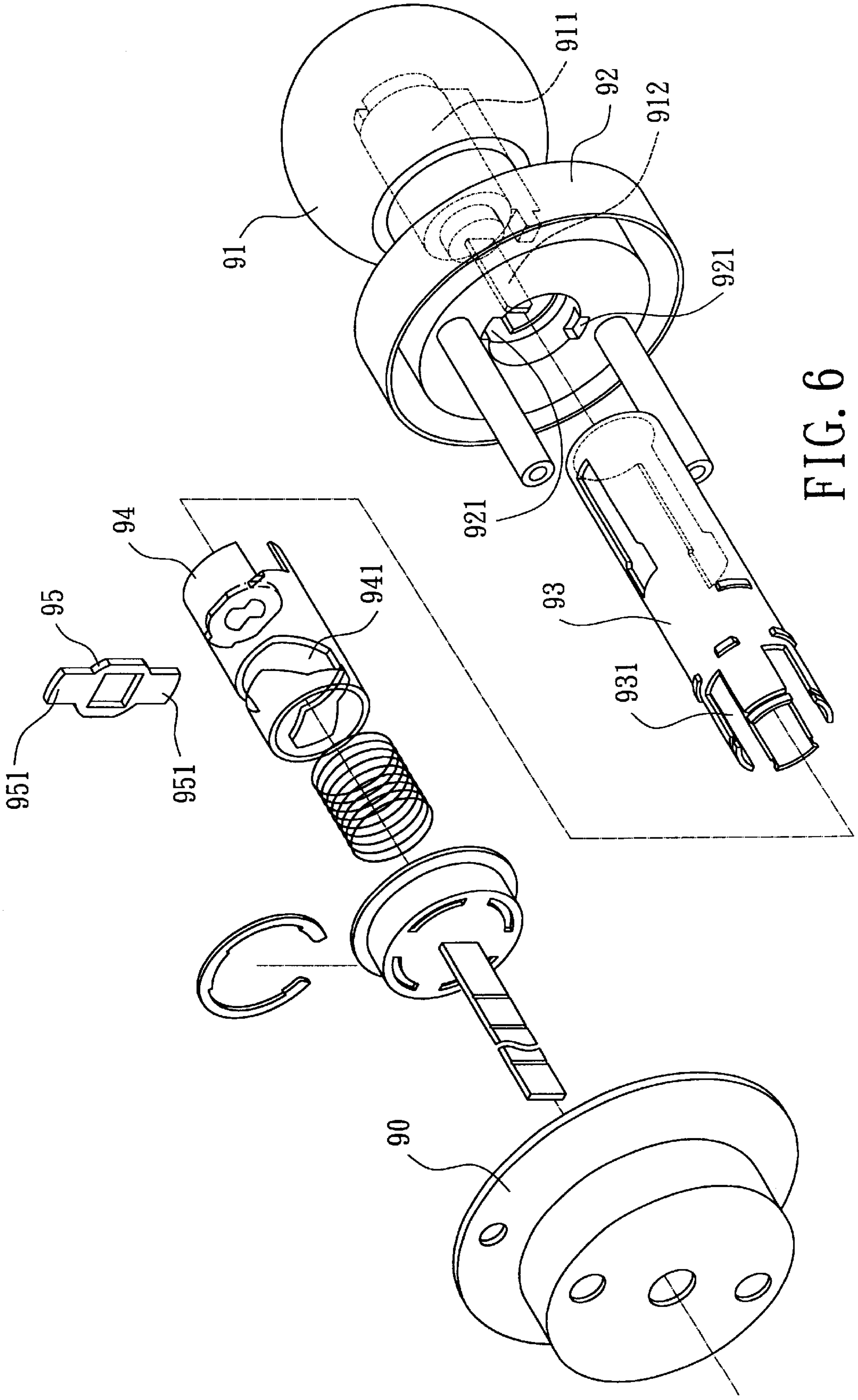
FIG. 6 PRIOR ART
FIG. 6 is an exploded perspective view of an outer handle assembly of a conventional lock.

Referring to FIGS. 1 and 5, a lock in accordance with the present invention generally includes an inner handle assembly 8, an outer handle assembly, and a latch assembly 7 having a latch bolt 71. The outer handle assembly comprises an outer handle 1, an outer spindle 2, an actuating sleeve 3, a cap 4, and a mounting member 5.

Figure 2:
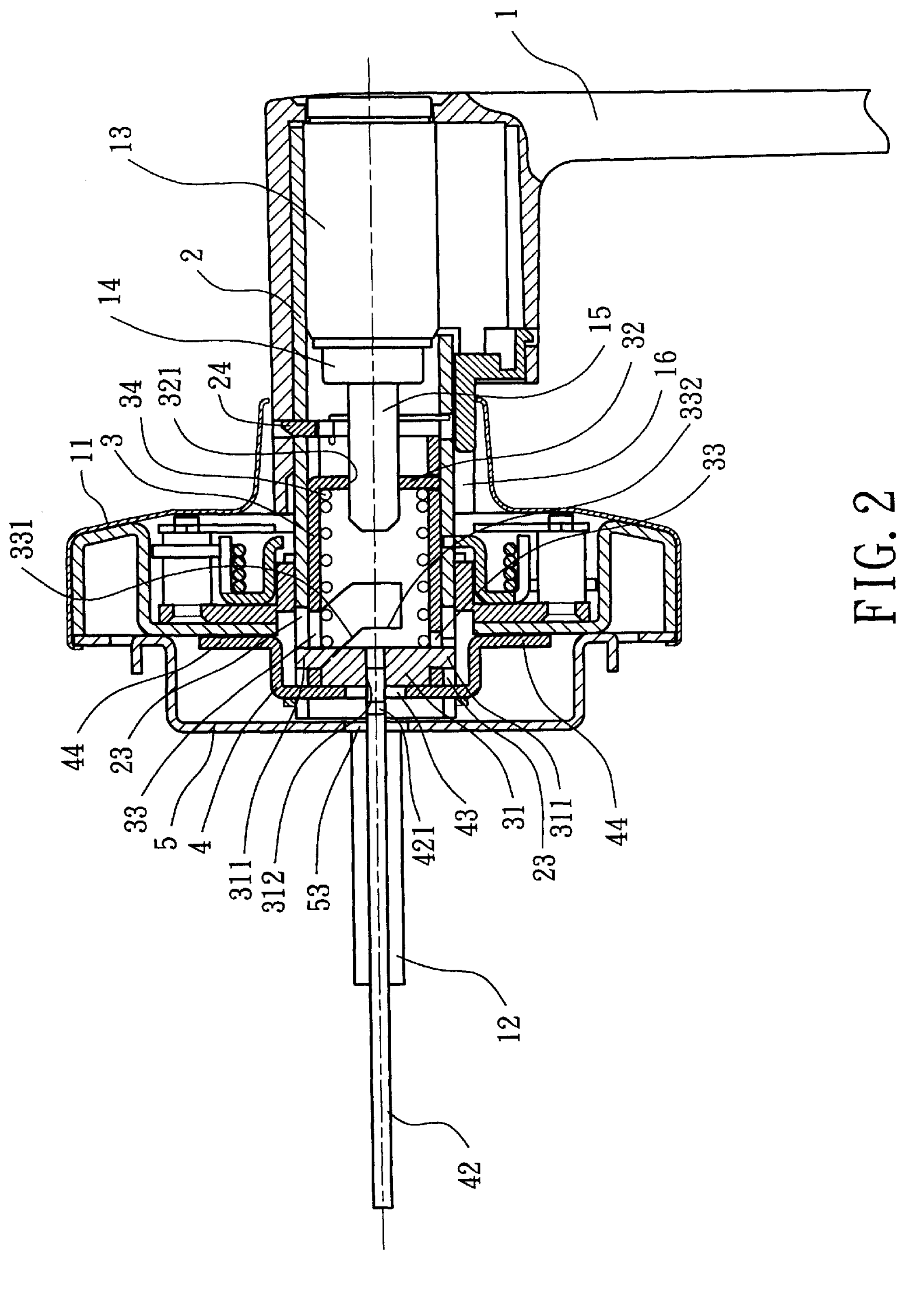
FIG. 2 is a sectional view of the outer handle assembly of the lock in FIG. 1, wherein the lock is in an unlocked state.

Referring to FIGS. 1, 2, and 5, the mounting member 5 includes fixing holes 51 through which fasteners (not shown) are extended to thereby fix the mounting member 5 to a doorplate (not labeled). The mounting member 5 further includes a central hole 53 and two holes 52 that are preferably diametrically disposed.

The outer handle 1 can be of any shape, e.g., a knob or a lever shown in the figures. The outer handle 1 has an end pivotally received in an axial hole 17 of an outer rose 11. The outer rose 11 has two posts 12 extending through the holes 52 of the mounting member 5 for engagement with the inner handle assembly 8 by fasteners (not shown), which is conventional and therefore not described in detail. A lock core set 13 is mounted in the outer handle 1 and includes a lock core 14 with a tailpiece 15. The lock core 14 may be turned by a proper key for turning the actuating sleeve 3 through transmission by the tailpiece 15. The lock core set 13 further includes a protrusion 13a that extends through a slot 16 in the outer handle 1, thereby retaining the lock core set 13 in place.

The outer spindle 2 includes an end attached to the outer handle 1 to turn therewith. The outer spindle 2 extends through the axial hole 17 in the outer rose 11 and includes a positioning slot 21 through which the protrusion 13*a* of the lock core set 13 extends. An abutting plate 24 is mounted in an intermediate portion of the outer spindle 2, and the actuating sleeve 3 is received in the outer spindle 2. Further, the other end of the outer spindle 2 is securely attached to the cap 4 that is mounted in the mounting member 5. In this embodiment, the other end of the outer spindle 2 includes a plurality of end pieces 22 projecting therefrom. The end pieces 22 are extended through engaging holes 41 in the cap 4 and then bent, thereby preventing disengagement of the cap 4. Thus, the actuating sleeve 3 is restrained inside the outer spindle 2 and could not move along a longitudinal direction due to confinement by the abutting plate 24 and the cap 4. The outer spindle 2 further includes two limiting slots 23, which will be described later.

The actuating sleeve 3 mounted in the outer spindle 2 includes an end having an actuating member 32 provided thereon. The actuating member 32 may be integrally formed with the actuating sleeve 3 and include a FIG. 8 hole 321 into which the tailpiece 15 of the lock core 14 extends. When a proper key 6 is used to turn the lock core 14, the actuating sleeve 3 is turned by the tailpiece 15. The FIG. 8 hole 321 allows 90° free rotation of the key 6 to its original position allowing removal of the key 6. The actuating sleeve 3 further includes two aligned guide slots 33 in a periphery thereof, each guide slot 33 including an inclined section 331 and a horizontal section 332.

A locking plate 31 is mounted in the actuating sleeve 3 and includes two wings 311 extending therefrom. An elastic element 34 is mounted in the actuating sleeve 3 and attached between the locking plate 31 and the actuating member 32, best shown in FIG. 2. Each wing 311 of the locking plate 31 extends through an associated guide slot 33 into an associated positioning slot 23 of the outer spindle 2. Thus, the locking plate 31 may only move along the longitudinal direction of the outer spindle 2. The locking plate 31 further includes a non-circular hole 312 for releasably engaging with an end of an unlatching member 42. The unlatching member 42 is connected to the latch assembly 7 and the inner handle assembly 8 (FIG. 5). When either an inner handle (not labeled) of the inner handle assembly 8 or the outer handle 1 is turned, the unlatching member 42 is turned for retracting the latch bolt 71, thereby allowing opening of the doorplate.

When the actuating sleeve 3 turns together with the tailpiece 15 to a locking state, the actuating sleeve 3 may turn relative to the outer spindle 2, but longitudinal movement of the actuating sleeve 3 is prevented by the abutting plate 24 and the cap 4. Further, since the wings 311 of the locking plate 31 are retained in the actuating slots 33 and the positioning slots 23 of the outer spindle 2, each wing 311 of the locking plate 31 is guided by the inclined section 331 of the associated guide slot 33 and moved longitudinally along the associated positioning slot 23 of the outer spindle 2 during rotation of the outer spindle 3. Thus, the locking plate 31 approaches the actuating member 32 with each wing 311 retained in the horizontal section 332 of the associated positioning slot 23 of the outer spindle 2. Thus, the locking plate 31 is disengaged from the unlatching member 42. As a result, the outer handle 1 turns freely when the lock is in the locking state, as the unlatching member 42 could not be turned. Nevertheless, rotation of the inner handle of the inner handle assembly 8 directly turns the unlatching member 42, which causes retraction of the latch bolt 71, allowing subsequent opening of the doorplate. Alternatively, when a proper key 6 is used to turn the lock core 14, the actuating sleeve 3 is turned by the tailpiece 15 of the lock core 14. Each wing 311 of the locking plate 31 is guided by the inclined section 331 of the associated guide slot 33 and moved away from the actuating member 32 under the action of the elastic element 34 until the engaging hole 312 of the locking plate 31 is engaged with the unlatching member 42. In this case, rotation of the outer handle 1 causes rotation of the outer spindle 2, the locking plate 31, and the unlatching member 42, thereby retracting the latch bolt 71 and allowing opening of the doorplate.

The cap 4 includes a hole 43 through which the unlatching member 42 rotatably extends. Namely, the unlatching member 42 may turn freely in the hole 43 of the cap 4. The cap 4 further includes two lugs 44 for abutting against the posts 12, thereby restraining rotational movement of the outer spindle 2. The end of the unlatching member 42 includes two protuberances 421 such that an overall width of the end of the unlatching member 42 is greater than a diameter of the hole 43 of the cap 4 and a diameter of the hole 53 of the mounting member 5. The protuberances 421 of the unlatching member 42 are located between the cap 4 and the mounting member 5, thereby allowing rotational movement of the unlatching member 42 while preventing longitudinal movement of the unlatching member 42.

Referring to FIG. 2, when the lock is in an unlocked state, the locking plate 31 is biased by the elastic element 34 away from the actuating member 32 to a position in which the engaging hole 312 of the locking plate 31 engages with the unlatching member 42. Thus, when the outer handle 1 is turned, the outer spindle 2, the locking plate 31, and the unlatching member 42 are also turned, thereby retracting the latch bolt 71 and allowing opening of the doorplate.

Figure 3:
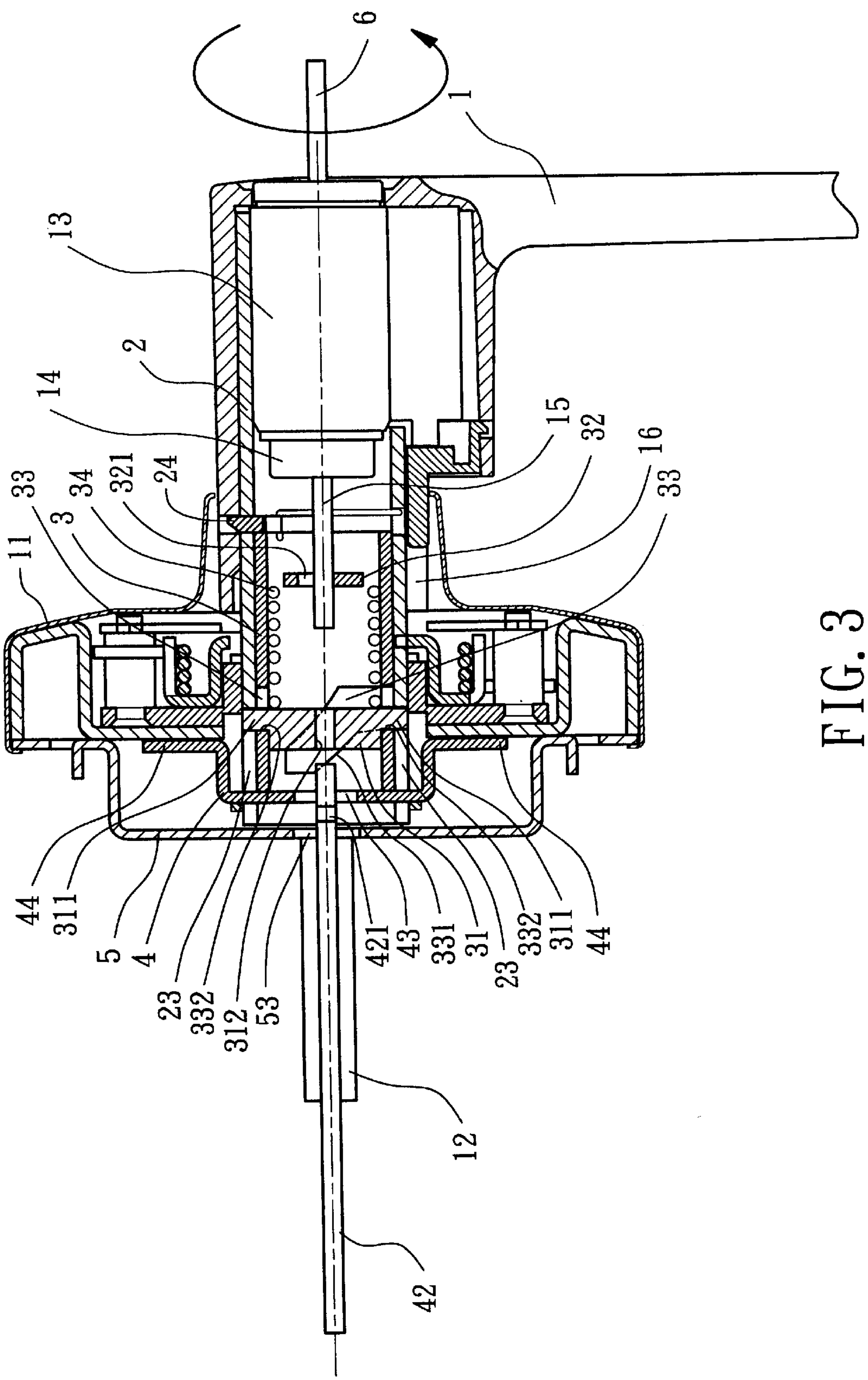
FIG. 3 is a sectional view similar to FIG. 2, wherein the lock is in a locked state.

Referring to FIG. 3, when a proper key 6 is used to turn the lock core 14 for switching lock to a locked state, the tailpiece 15 causes rotation of the actuating sleeve 3 in the outer spindle 2. Each wing 311 of the locking plate 31 is guided by the inclined section 331 of the associated guide slot 33, urging the locking plate 31 to move toward the actuating member 32 along the associated positioning slot 23 of the outer spindle 2, thereby causing disengagement of the locking plate 31 from the unlatching member 42. Each wing 311 of the locking plate 31 is retained in the horizontal section 332 of the associated guide slot 33 without the risk of returning to its original position shown in FIG. 2. Due to provision of the FIG. 8 hole 321 of the actuating member 32, the key 6 may be turned along a reverse direction for removal.

Figure 4:
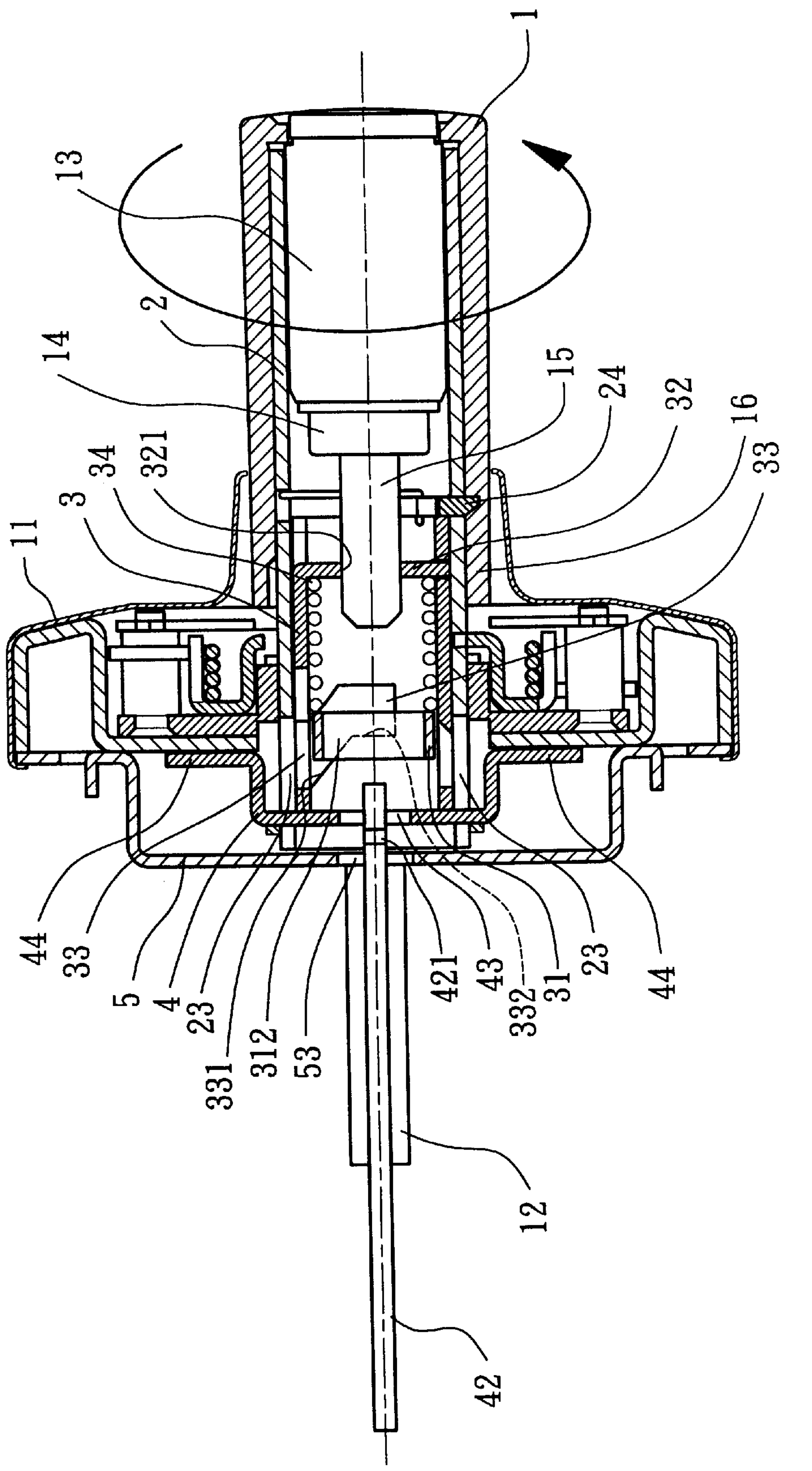
FIG. 4 is a sectional view similar to FIG. 3, illustrating free rotation of the outer handle.

Referring to FIG. 4, when the lock is in the locked state and when the outer handle 1 is turned, since the engaging hole 312 of the locking plate 31 is disengaged from the unlatching member 42, rotation of the outer handle 1 merely causes rotation of the locking plate 31, but the unlatching member could not be turned. Thus, the latch bolt 71 of the latch assembly 7 could not be retracted. Namely, the outer handle 1 turns freely when the lock is in the locked state.

Since the outer handle 1 turns freely when the lock is in the locked state, an unauthorized person could not damage the lock by means of forcibly turning the outer handle 1. Nevertheless, the lock still allows unlatching from inside by means of directly turning the inner handle regardless of the state of the lock.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A lock comprising an inner handle assembly, a latch assembly having a latch bolt, and an outer handle assembly, the outer handle assembly comprising:

an outer handle;

an outer rose including an axial hole for pivotally receiving an end of the outer handle, the outer rose further including at least one post for connection with the inner handle assembly;

a lock core set mounted in the outer handle and including a lock core that is actuatable by a key to turn, the lock core having a tailpiece;

an outer spindle including a first end connected to the outer handle to turn therewith and a second end including at least one positioning slot;

an actuating sleeve rotatably mounted in the outer spindle, the actuating sleeve including a hole on an end thereof, the tailpiece extending through the hole of the actuating sleeve, the hole being so configured that the actuating sleeve is turned when the lock core and the tailpiece are turned, the actuating sleeve and the outer spindle being so configured that longitudinal movement of the actuating sleeve relative to the outer spindle is not allowed, the actuating sleeve further including at least one guide slot each having an inclined section and a horizontal section;

a locking plate mounted in the actuating sleeve and including at least one wing, the wing being extended through the guide slot into the positioning slot of the outer spindle, the wing being retainable by the horizontal section of the guide slot, the wing being driven by the inclined section of the guide slot to allow longitudinal movement;

an unlatching member including a first end releasably engaged with the locking plate to allow or prevent joint rotation of the unlatching member and the locking plate, the unlatching member further including a second end operably connected to an inner handle of the inner handle assembly, the unlatching member being operably connected to the latch bolt such that rotation of the unlatching member causes retraction of the latch bolt;

a cap fixed to the second end of the outer spindle and including a hole through which the unlatching member extends, the hole of the cap allowing free rotation of the unlatching member;

wherein when the lock is in an unlocked state, the first end of the unlatching member is engaged with the locking plate to allow joint rotation; and wherein when the lock is switched from the unlocked state to a locked state, said wing of the locking plate is guided by the inclined section of the guide slot, and then retained in the horizontal section the guide slot, the locking plate being moved away a predetermined longitudinal distance and thus disengaged from the first end of the unlatching member to prevent joint rotation such that the unlatching member is can not be turned to avoid destruction caused by an exerted force when the outer handle is separately turned and idled while the lock is in the locked state.

2. The lock as claimed in claim 1, further comprising an abutting plate mounted in the outer spindle to prevent longitudinal movement of the actuating sleeve relative to the outer spindle.

3. The lock as claimed in claim 1, wherein the hole of the actuating sleeve is a FIG. 8 hole.

4. The lock as claimed in claim 1, further comprising an elastic element mounted in the actuating sleeve, the elastic element having a first end attached to the locking plate and a second end attached to an end wall of the end of the actuating sleeve, the elastic element biasing the locking plate to engage with the first end of the unlatching member.

5. The lock as claimed in claim 1, further comprising a mounting seat fixed to a doorplate, the mounting seat being located on a side of the outer rose and including a central hole through which the unlatching member rotatably extends, the mounting seat further including at least one hole through which said at least one post extends.

6. The lock as claimed in claim 1, wherein the cap includes a plurality of engaging holes, the second end of the outer spindle including a plurality of end pieces that are extended through the engaging holes in the cap and then bent, thereby securely fixing the cap to the second end of the outer spindle.

7. The lock as claimed in claim 1, wherein the cap further includes at least one lug for abutting against said at least one post of the outer rose, thereby limiting rotational movement of the outer spindle.

8. The lock as claimed in claim 1, wherein the first end of the unlatching member includes two protuberances such that the first end of the unlatching member has a width greater than a diameter of the hole of the cap.

9. The cap as claimed in claim 4, wherein when the lock is in the locked state and when the lock core is turned by the key, the actuating sleeve is turned and each said wing of the locking plate is moved into and guided by the inclined section of an associated one of the guide slots, the locking plate being moved to engage with the first end of the unlatching member under action of the elastic element.

* * * * *

UNITED STATES PATENT AND TRADEMARK OFFICE

CERTIFICATE OF CORRECTION

PATENT NO. : 6,742,367 B2
DATED : June 1, 2004
INVENTOR(S) : Wen bin Wu

It is certified that error appears in the above-identified patent and that said Letters Patent is hereby corrected as shown below:

Title page,
Item [54], Title, should read:
-- LOCK RESISTANT TO FORCIBLE TURNING OF OUTER HANDLE --

Signed and Sealed this

Thirty-first Day of August, 2004

JON W. DUDAS
*Director of the United States Patent and Trademark Office*